US012680457B2

(12) United States Patent (10) Patent No.: US 12,680,457 B2

Marger et al. (45) Date of Patent: Jul. 14, 2026

(54) ELECTRONICALLY PILOTED LOW PITCH STOP PROTECTION

(71) Applicant: Ratier-Figeac SAS, Figeac (FR)

(72) Inventors: Thibaut Marger, Beduer (FR); Romain Bouloc, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 0 days.

(21) Appl. No.: 19/052,826

(22) Filed: Feb. 13, 2025

(65) Prior Publication Data

US 2025/0290425 A1 Sep. 18, 2025

(30) Foreign Application Priority Data

Mar. 13, 2024 (EP) ..................................... 24305378

(51) Int. Cl.
  *F01D 7/00* (2006.01)
  *B64C 11/38* (2006.01)
  *B64C 11/40* (2006.01)
(52) U.S. Cl.
  CPC ................ *F01D 7/00* (2013.01); *B64C 11/38* (2013.01); *B64C 11/385* (2013.01); *B64C 11/40* (2013.01)
(58) Field of Classification Search
  CPC ....... B64C 11/38; B64C 11/385; B64C 11/40; F01D 7/00
  See application file for complete search history.

(56) References Cited

U.S. PATENT DOCUMENTS

| | | | | |
|---|---|---|---|---|
| 2,801,701 A | * | 8/1957 | Coar ..................... | B64C 11/385 |
| | | | | 416/43 |
| 3,090,445 A | * | 5/1963 | Fischer ................. | B64C 11/385 |
| | | | | 416/46 |
| 3,115,938 A | * | 12/1963 | Fischer ................. | B64C 11/385 |
| | | | | 416/50 |

(Continued)

FOREIGN PATENT DOCUMENTS

| | | |
|---|---|---|
| CN | 114313220 A | 4/2022 |
| EP | 4458677 A1 | 11/2024 |
| FR | 2689853 A1 | 10/1993 |

OTHER PUBLICATIONS

European Search Report for Application No. 24305378.2, mailed Aug. 12, 2024, 10 pages.

*Primary Examiner* — Courtney D Heinle
*Assistant Examiner* — Behnoush Haghighian
(74) *Attorney, Agent, or Firm* — CANTOR COLBURN LLP

(57) ABSTRACT

A blade pitch control and protection system for a propeller includes: an actuator where displacement of said actuator corresponds to a change in blade pitch of said propeller; an electronic unit, a position control sensor configured to interact with said actuator. The position control sensor detects actuator position and thereby said blade pitch of said propeller, and to send a control feedback signal to said electronic unit via a first channel, based on said blade pitch, and a protection sensor configured to interact with said actuator, configured to detect actuator position and thereby said blade pitch of said propeller, and to send a protection feedback signal to said electronic unit via a second channel, based on said blade pitch. The electronic unit is configured to, based on said control feedback signal, control movement of said actuator to alter said blade pitch through a control command.

16 Claims, 2 Drawing Sheets

(56) References Cited

U.S. PATENT DOCUMENTS

| | | | | |
|---|---|---|---|---|
| 5,037,271 A * | 8/1991 | Duchesneau | ........... | B64C 11/38 |
| | | | | 416/157 R |
| 5,042,966 A * | 8/1991 | Schwartz | ................ | B64C 11/38 |
| | | | | 416/157 R |
| 5,174,718 A * | 12/1992 | Lampeter | ................ | B64C 11/38 |
| | | | | 416/157 R |
| 5,186,608 A * | 2/1993 | Bagge | ..................... | B64C 11/38 |
| | | | | 416/37 |
| 5,897,293 A * | 4/1999 | Arel | ...................... | B64C 11/303 |
| | | | | 416/49 |
| 6,059,528 A * | 5/2000 | Danielson | ............. | B64C 11/303 |
| | | | | 416/61 |
| 6,077,040 A | 6/2000 | Pruden et al. | | |
| 8,545,178 B2 | 10/2013 | Perkinson et al. | | |
| 9,945,301 B2 | 4/2018 | Carrington | | |
| 10,384,763 B2 | 8/2019 | Carrington | | |
| 10,683,082 B2 * | 6/2020 | Lassalle | ................. | B64C 11/40 |
| 10,717,517 B2 | 7/2020 | Lassalle et al. | | |
| 11,097,832 B2 | 8/2021 | Maver | | |
| 11,479,339 B2 * | 10/2022 | Danielson | ............... | B64C 11/38 |
| 11,827,336 B2 * | 11/2023 | Maver | ..................... | B64C 11/40 |
| 12,037,100 B2 * | 7/2024 | Castellani | ............. | B64C 11/385 |
| 12,065,234 B2 * | 8/2024 | Calkins | ................... | B64C 11/44 |
| 2003/0002983 A1 * | 1/2003 | Perkinson | .............. | B64C 11/40 |
| | | | | 416/48 |
| 2017/0313406 A1 * | 11/2017 | Lassalle | ................. | B64C 11/40 |
| 2020/0189721 A1 * | 6/2020 | Maver | ................. | B64C 11/385 |
| 2020/0298959 A1 * | 9/2020 | Castellani | .............. | F01D 5/021 |

* cited by examiner

ELECTRONICALLY PILOTED LOW PITCH STOP PROTECTION

CROSS-REFERENCE TO RELATED APPLICATIONS

This application claims the benefit of European Patent Application No. 24305378.2 filed Mar. 13, 2024, the disclosure of which is incorporated herein by reference in its entirety.

FIELD

The examples disclosed herein relate to blade pitch feedback of a propeller control system.

BACKGROUND

Aircraft propellers comprise a plurality of blades fixed to a rotating propeller hub. Blade pitch refers to the angle between the propeller blade chord line and the plane of rotation of the propeller. Variable pitch propellers are provided with a pitch change system that enables the blade pitch of each blade to be collectively controlled. Variable pitch propeller blades allow the angle of attack of the blade relative to the oncoming airflow to be varied. For example, the blade pitch can be adjusted from feather position (minimum thrust/drag) to a reverse position that may provide reverse thrust. A propeller blade that is at a high pitch angle produces more thrust at a given RPM (revolutions per minute) than at low pitch.

Propeller pitch change systems commonly use hydraulic actuation systems to control the pitch of the propeller blade. A typical hydraulic actuator comprises a hydraulic piston housed within a piston sleeve. A cover is usually provided at a forward-most end such that a first chamber is formed between the cover sleeve and piston and a second chamber is formed between the sleeve and the piston, the piston separating the chambers.

A transfer tube usually extends from the piston chambers axially aftward to a hydromechanical control unit which meters hydraulic flow and pressure to the two sides of the pitch change actuator piston in response to an electrical signal provided from an electronic unit (a propeller dedicated electronic unit, a FADEC or Aircraft electronic unit).

A position sensor is positioned at the end of the transfer tube inside the hydromechanical control unit to provide electrical signals to the electronic control unit that are indicative of sensed actuator linear position (being the mirror of the sensed blade angle position). Usually the position sensor is a duplex rotary variable differential transformer (RVDT) or linear variable differential transformer (LVDT) in order to comply with aircraft safety and dispatchability requirements. RVDT or LVDT feedback are calibrated at aircraft level upon pilot demand. Supply pressure is provided at the hydromechanical control unit inlet by a hydraulic fluid source (hydraulic pumps).

The electronic unit software embeds primary low pitch stop functions during in-flight operation as well as governing speed settings. These electronic functions are backed-up by a hydromechanical overspeed governor and a secondary low pitch stop. A protection valve (hydraulic spool and sleeve) located inside the hydromechanical control unit allows the hydromechanical backup devices (the overspeed governor, the secondary low pitch stop and the feather triggering system) to assume pitch change control authority whilst bypassing the primary control device (electrohydraulic valve) in case of failure. The activation of the protection valve results in the actuation of the blades towards coarse pitch.

Movement of the valve spool of the protection valve towards the protected position preventing any additional reduction in the blade angle (secondary low pitch stop) is triggered through an orifice at the aft side of the hydromechanical control unit transfer bearing (the transfer bearing transmitting the hydraulic flow from the hydromechanical control unit stationary field to the rotating transfer tube): at the minimum in-flight blade angle the transfer tube begins to uncover this orifice and drains flow from the reference pressure side of the protection valve. Consequently, the secondary low pitch stop is fully performed hydro-mechanically.

Pre-flight automatic tests are performed at aircraft level to guarantee that the secondary low pitch stop protection is working properly.

As the secondary low pitch stop is a pure hydromechanical device, to make its triggering threshold accurate a manual rigging is requested when installing the transfer tube.

Drawbacks of this hydromechanical low pitch protection system architecture are: additional complexity of the transfer tube and hydromechanical control unit transfer bearing with additional accurate orifice/slot and sharp edge, additional length of the transfer tube and transfer bearing whereas these parts are located in a constrained nacelle space, dedicated hydraulic piping inside the hydromechanical control unit to provision and the manual rigging of the transfer tube.

The examples described herein therefore aim to overcome these disadvantages.

SUMMARY

According to a first aspect, a blade pitch control and protection system for a propeller is provided, comprising: an actuator configured to be connectable to a propeller, such that displacement of said actuator corresponds to a change in blade pitch of said propeller; the system further comprising: an electronic unit, a position control sensor configured to interact with said actuator to detect actuator position and thereby said blade pitch of said propeller, and to send a control feedback signal to said electronic unit via a first channel, based on said blade pitch, and a protection sensor configured to interact with said actuator to detect actuator position and thereby said blade pitch of said propeller, and to send a protection feedback signal to said electronic unit via a second channel, based on said blade pitch, and wherein said electronic unit is configured to, based on said control feedback signal, control movement of said actuator through a control command to alter said blade pitch, and wherein said electronic unit is further configured to, based on said protection feedback signal, control movement of said actuator through a protection command such that said blade pitch control command is overridden when said protection feedback signal indicates that the blade pitch has reached a predefined value.

In some examples, said predefined value is below a blade pitch value threshold, and the electronic unit is configured to, based on said protection feedback signal, control movement of said actuator through a protection command such that said blade pitch of said propeller is increased when said protection feedback signal indicates that the blade pitch has reached the predefined value.

In some examples, said control and protection sensors are configured to function mechanically and electrically independently of each other and have the capability to provide independent feedback signals via the first and second channels to the electronic unit.

In some examples, said control and protection sensors are simplex, duplex or triplex sensors.

In some examples, said first and second channels are single channel, dual channel or triple feedback signal channels.

In some examples, actuator comprises a transfer tube, wherein each of the control and protection sensors is connected to the transfer tube.

In some examples, each of the control and protection sensors is connected to the transfer tube through dedicated redundant mechanical kinematics.

In some examples, one, or both of said control and protection sensors comprises one or more rotational displacement sensors, and optionally wherein said one or more rotational displacement sensors comprise an RVDT sensor.

In some examples, one, or both of said control and protection sensors is a contact or contactless sensor.

In some examples, one, or both of said control and protection sensors is capable of direct or indirect sensing.

In some examples, one, or both of said control and protection sensors comprises one or more linear displacement sensor, and optionally wherein said one or more displacement sensors comprises an LVDT sensor.

In some examples, the system further comprises: a control device, said control device comprising an electro-hydraulic servovalve device, a protection valve and at least one protection activation unit and the electronic unit. Said electronic unit is configured to, based on said control feedback signal, command through a control command the electro-hydraulic servovalve device and thereby the movement of said actuator, and, when said blade pitch has reached said predefined level, said electronic unit is configured to enable through a protection command said protection activation unit and thereby said protection valve and thereby isolate the actuator from the electro-hydraulic servovalve device, thereby overriding the control command. In some examples, the protection valve is in fluid communication with the actuator, and the electro-hydraulic servovalve device can be selectively set in fluid communication with the actuator through the protection valve.

A propeller is also described herein comprising at least one blade, or a plurality of blades, and the blade pitch control and protection system described herein is used to control and protect the pitch of the blade or plurality of blades.

In some examples, the electronic unit can be formed of one or several separated modules.

The protection activation unit can be a solenoid, an electromagnet or any other suitable organ located on the protection valve or remote therefrom.

The blade pitch value threshold can be fixed, or may be adjusted by the electronic unit, or a unit in communication therewith, for instance as a function of flight parameters (aircraft speed, altitude etc.).

The blade pitch value threshold adjustment can be performed through any suitable means, for instance look-up tables, calculation, mathematical functions, e.g. as presented for instance in European patent application EP23315156.

According to a second aspect, a method of controlling and protecting a blade pitch for a propeller is also described herein comprising: providing an actuator that is configured to be connectable to said propeller, such that displacement of said actuator corresponds to a change in blade pitch of said propeller; providing an electronic unit, providing a position control sensor to said actuator, said position control sensor being configured to interact with said actuator, to detect actuator position and thereby said blade pitch of said propeller, and said position control sensor sending a control feedback signal to said electronic unit via a first channel, based on said blade pitch, and providing a protection sensor to said actuator, configured to interact with said actuator, to detect actuator position and thereby said blade pitch of said propellor, and said protection sensor sending a protection feedback signal to said electronic unit via a second channel, based on said blade pitch, said electronic unit controlling through a control command, based on said control feedback signal, movement of said actuator to alter said blade pitch, and said electronic unit controlling through a protection command, based on said protection feedback signal, movement of said actuator such that said blade pitch control command is overridden when said protection feedback signal indicates that the blade pitch has reached a predefined value.

In some examples, the method further comprises providing a control device, said control device comprising an electro-hydraulic servovalve device, a protection valve and at least one protection activation unit, and controlling, via said protection activation unit, movement of said protection valve, the electronic unit commanding, through a control command, based on said control feedback signal, movement of said electro-hydraulic servovalve device and thereby the movement of said actuator, and wherein, when said blade pitch has reached said predefined level, said electronic unit enables through a protection command said protection activation unit and thereby said protection activation valve, isolating the actuator from the electro-hydraulic servovalve device and thereby overriding the control command.

DETAILED DESCRIPTION

As described above, aircraft propellers comprise a plurality of blades fixed to a rotating propeller hub.

Figure 1:
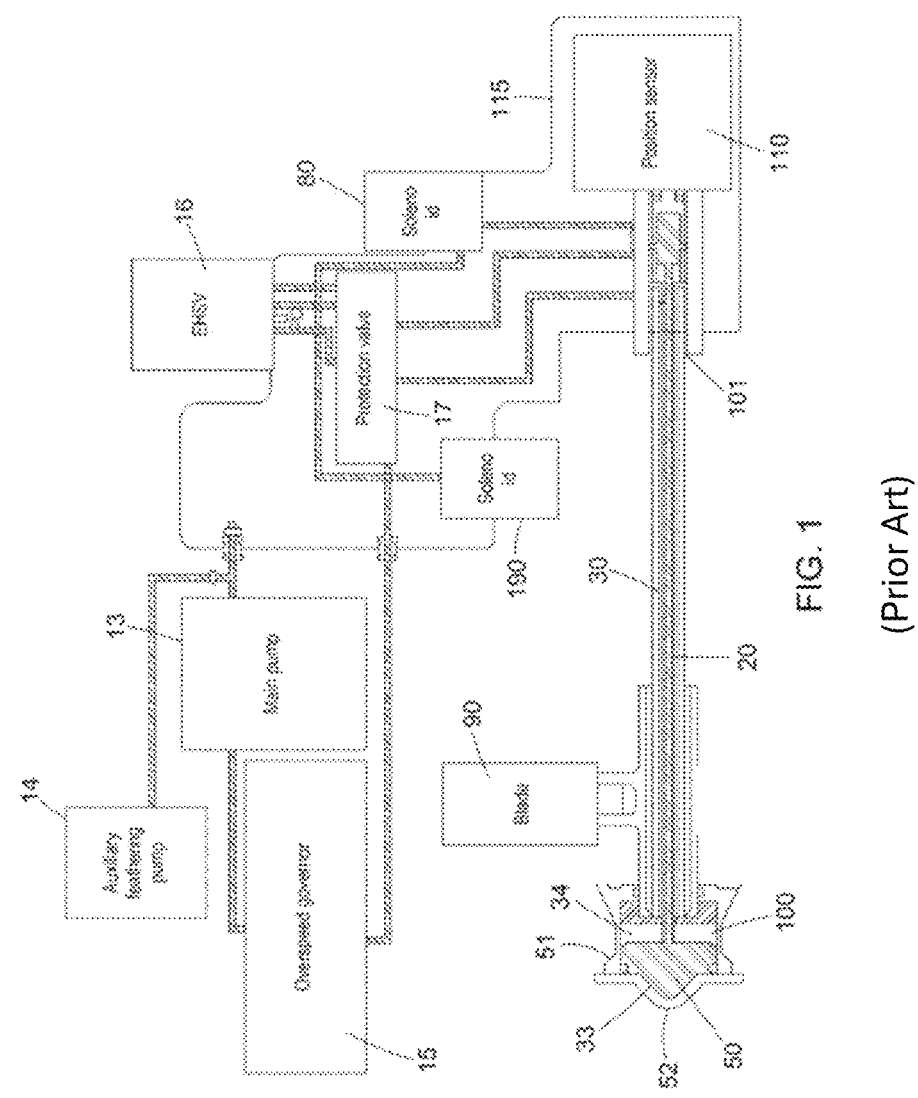
FIG. 1 shows a schematic of a propeller control system that is protected via a hydraulic-mechanical system.

FIG. 1 shows a schematic of a first type of propeller control system that uses a sensor 110 for monitoring and controlling blade pitch and a hydro-mechanical protection unit 115 for protecting the pitch in use. The unit 115 can be called a propeller control module or a propeller valve module, as it manages both the control and the protection for the blade pitch. The actuator 100 is connected to the blade foot 90 in use.

In use, hydraulic pressure acts on an actuator piston 5 of the actuator 100 to thereby move the blades and change the blade pitch. The position of the actuator 100 is piloted by fluid under pressure which is provided to the actuator 100 from the static propeller part via a transfer tube 40. That is, the blade pitch movement of a blade foot is driven by the hydraulic actuator 100, wherein the blade foot is connected to the hydraulic actuator 100 via a kinematic. The hydraulic actuation system controls the pitch of the propeller blade.

The hydraulic actuator 100 comprises a hydraulic piston 50 housed within a piston sleeve 51. A cover 52 is provided at a forward-most end such that a first chamber 33 is formed between the cover 52 and piston 50 and a second chamber 34 is formed between the sleeve 51 and the piston 50, the piston 50 separating the 2 chambers.

A transfer tube 40 extends from the actuator 100 axially aftward 101 to the hydromechanical control unit 115 which meters hydraulic flow and pressure to the two chambers 33 and 34 in response to an electrical signal provided from an electronic unit (a propeller dedicated electronic unit, a FADEC or Aircraft electronic unit).

The actuator 100 comprises the transfer tube 40, which comprises an outer tube 20 and inner tube 30 provided therein. The outer tube 20 is hydraulically connected to chamber 34. The inner tube 30 is hydraulically connected to chamber 34. The blade foot (and resulting blade pitch) is controlled via movement of the actuator 100 using the hydraulic pressure applied to the inner tube 30 and outer tube 20 being responsible for hydraulically moving and controlling the propeller blade of an aircraft in use (not shown).

As can be seen in FIG. 1, the hydromechanical actuator 100 comprises the transfer tube 40, which is configured to translate when the actuator moves. The control means of this architecture measures the axial position of the transfer tube 40 in order to determine the blade pitch. This can be achieved using a position sensor 110 such as a rotary variable differential transformer (RVDT). In this architecture, the blade pitch feedback used by the propeller control system is so obtained by measuring the aft side axial displacement of the transfer tube 40. It can therefore be said that the propeller blade pitch is in turn a function of both the actuator 100 position as well as the transfer tube 40 position.

The position sensor 110 is positioned at the end of the transfer tube 40 inside the hydromechanical control unit 115 to provide electrical signals to the electronic control unit that are indicative of sensed actuator linear position (being the mirror of the sensed blade angle position). In the example shown in FIG. 1 the position sensor 110 is a duplex rotary variable differential transformer (RVDT). In other examples it may be a linear variable differential transformer (LVDT). Duplex sensors are used to comply with aircraft safety and dispatchability requirements, but simplex sensor might also be used. RVDT or LVDT feedback are calibrated at aircraft level upon pilot demand.

The electronic unit software embeds primary low pitch stop functions during in-flight operation as well as governing speed settings. These electronic functions are backed-up by a hydromechanical overspeed governor 15, and an orifice at the aft side 101 of the hydromechanical control unit transfer bearing combined with at least one protection activation unit 80, configured to control movement of a protection valve 17. The protection activation unit 80 may comprise a secondary low pitch stop solenoid 80 as shown in the figure. In other examples, the protection activation unit 80 may comprise a valve with direct control, or an electromagnet as an alternative to a solenoid. The protection valve 17 (hydraulic spool and sleeve) may be located inside the hydromechanical protection unit 115 and allows the hydromechanical backup devices (i.e. the overspeed governor 15, the orifice at the aft side of the hydromechanical control unit transfer bearing 101 combined with the protection activation unit (e.g. a secondary low pitch stop solenoid 80) and a feather triggering system solenoid 190) to assume pitch change control authority whilst bypassing the primary control device (electrohydraulic valve) in case of failure. The activation of the protection valve results in the actuation of the blades towards coarse pitch.

Supply pressure is provided at the hydromechanical control unit 115 inlet by a hydraulic fluid source (hydraulic pumps). The system comprises a main pump 13 and an auxiliary feathering pump 14. The overspeed governor 15 uses the same mechanical entry as the main pump 13, thereby allowing the rotational speed to be determined. The overspeed governor 15 is the main hydromechanical component which drives the propeller to a safe position when the propeller has to be protected against overspeed, i.e. a propeller rotational speed that is too high.

The protection valve 17 receives fluid under return pressure and supply pressure and provides fluid under fine pitch pressure and coarse pitch pressure to the actuator 100. If disabled, the protection valve 17 provides Electro-Hydraulic Servo-Valve (EHSV 16) flow and pressure to the feed actuator 100, If the protection valve 17 is enabled, the protection valve 17 uses supply pressure to feed the coarse chamber and return pressure to feed the fine chamber of the actuator 100 (not shown).

It is mandatory (driven by safety constraints) to not go below a predefined blade pitch in flight. This limit is called the secondary low pitch stop (SLPS). To do that, this architecture uses a hydro-mechanical form of protection that is provided so as to prevent a control failure. That is, a slot connected to a protection valve control pipe is provided.

When the transfer tube 40 is driven towards a low pitch that corresponds to the predefined lowest allowable blade pitch, the protection valve 17 control pipe is opened to return pressure. Consequently, the control is by-passed, and supply pressure is commanded to the coarse chamber (not shown) of the actuator 100 (respectively, return pressure is commanded to the fine chamber). The blade pitch will then increase.

For landing, the blade pitch must be able to be switched into reverse. In order to allow for this, the architecture utilises the secondary low pitch stop retract solenoid 80. The secondary low pitch stop retract solenoid 80 is configured to inhibit the protection provided by the protection means when the aircraft is close to landing.

This architecture has certain drawbacks, however, in that the slot and transfer tube 40 sharp edge are difficult and expensive to manufacture. Additionally, the envelope required for the hydraulic pipe in the hydro-mechanical protection component is complex. A further drawback is that the transfer tube zero position must be set during assembly to ensure the activation of the protection at the right pitch. Additionally, the protection activation unit 80 must be added, as described above, to inhibit protection for landing and this can expensive. Finally, the transfer tube 40 requires a long length in order for it to function and this can increase weight to the structure.

Figure 2:
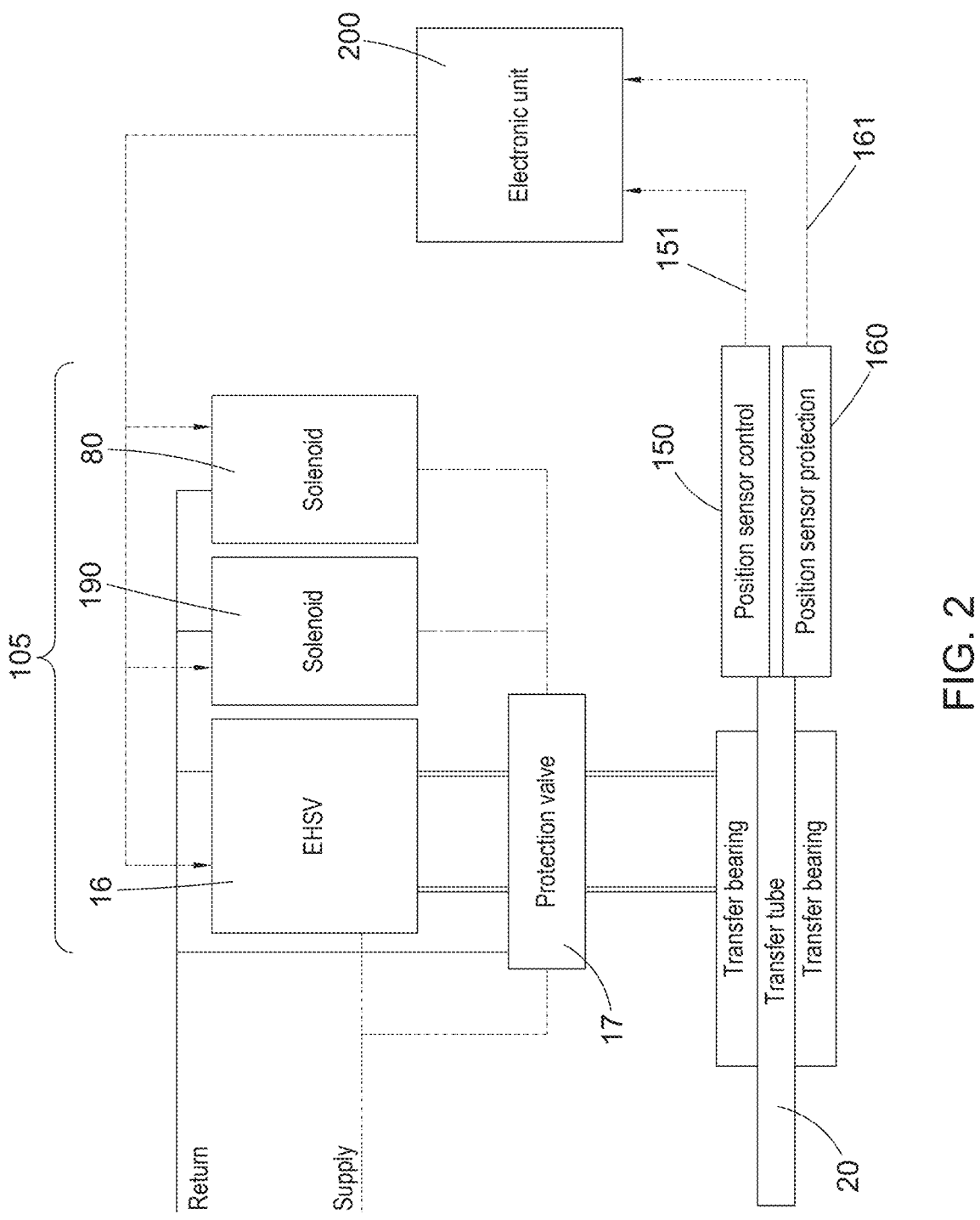
FIG. 2 shows a schematic of a new type of blade control and protection system wherein both control and protection are achieved electronically.

Another example of a blade pitch control and protection system is depicted in FIG. 2. The same, or a similar architecture for controlling the blade foot and providing hydraulic fluid to the actuator may be used as is described above with reference to FIG. 1. That is, the components of FIG. 2 are identical to those shown in FIG. 1, except where identified. In contrast to the system shown in FIG. 1, however, although a sensor 110 is still used for monitoring and controlling blade pitch, the protection mechanism is not hydraulic but is piloted electronically.

Referring to FIG. 2, the hydraulic actuator 100 comprises a hydraulic piston 50 (as shown in FIG. 1) housed within a piston sleeve 51 (as shown in FIG. 1). As for the example shown in FIG. 1a cover 52 is also provided at a forwardmost end such that a first chamber 33 is formed between the cover 52 and piston 50 and a second chamber 34 is formed between the sleeve 51 and the piston 50, the piston separating the chambers 33 and 34 in the same manner as shown in FIG. 1.

Again, a transfer tube 40 is provided that extends from the piston chambers 33 and 34 axially aftward 101 to a hydromechanical control unit 105 which meters hydraulic pressure to the two sides of the pitch change actuator piston 50 in response to an electrical signal provided from an electronic unit 200 (which may comprise a propeller dedicated electronic unit, a FADEC or Aircraft electronic unit).

Position sensors 150, 160, are positioned at the end of the transfer tube 40 to provide electrical signals to the electronic unit 200 indicative of sensed actuator linear position (being the mirror of the sensed blade angle position).

In contrast to the system of FIG. 1, two separate and independent sensors 150, 160 are provided that have been selected to provide segregated feedbacks to a) the electronic control software parts and b) to the electronic protection software parts.

Such sensors may comprise:
a) RVDT or LVDT sensors 150 for providing segregated feedback to the electronic control software parts of the system and
b) RVDT or LVDT sensors 160 for providing segregated feedback to the electronic protection software parts of the system.

Sensors may be simplex or duplex (or even triplex.) depending on aircraft safety and dispatchability requirements that have to be complied with. Any other suitable type of sensors may also be used and the control system of FIG. 2 is not limited to only these types.

The RVDT or LVDT feedbacks provided by these sensors can be automatically calibrated at aircraft level at the first flight or after any maintenance operation.

As for the example shown in FIG. 1, supply pressure may be provided at the protection and control unit inlet by a hydraulic fluid source (hydraulic pumps).

Electronic unit control software 200 is provided that is configured to embed primary low pitch stop functions during in-flight operation as well as governing speed settings.

A segregated electronic unit protection software embeds overspeed and secondary low pitch stop protections.

The electronic unit protection software will command electro-hydraulic devices (e.g. the solenoid valves 80, 190) displacement to drain flow from the reference pressure side of the protection valve (hydraulic spool and sleeve) located inside the hydromechanical control unit 115. The protection valve 17 allows the protections to be triggered (overspeed protection, secondary low pitch stop protection and propeller feathering) to assume pitch change control authority whilst bypassing the primary control device in case of system failure. The activation of the protection valve results in the actuation of the blades towards coarse pitch. In some examples, an electromagnetic control may be provided directly in line with the protection valve 17, in place of the protection solenoid 80 or 190.

Pre-flight automatic tests will be performed at aircraft level to guarantee that propeller overspeed & secondary low pitch stop protections are working properly in order to avoid dormant failures.

The electronic unit control & protection software may be embedded in dedicated propeller electronic units (1 unit with adequate segregation of the software inside it or 2 separated units) or in a FADEC (1 unit with adequate segregation of the software inside it or 2 separated units) or in aircraft electronic units (1 unit with adequate segregation of the software inside it or 2 separated units).

Dual channels (or even more, e.g. triple channels) for the control and the protection may be implemented to maximize the system dispatchability.

Kinematics which contacts the control and protection sensors with the aft side of the transfer tube will be redundant in order to avoid single failure points between the control and the protection system. This kinematics may be done with gears, shuttle roller & lever, transfer ball & lever, ball bearing & lever etc.

The control sensor 150 and protection sensor 160 are provided at the aft side 101 of the translating transfer tube 40 and allow for the physical protection from outside/environment disturbances. These sensors also provide a known position regardless of whether the propeller is rotating or not. They also provide a Stop-to-stop actuator displacement measurement.

This segregated control and protection system provides advantages in that there is now no more orifice, or slot needed with a sharp edge and so the complexity of the transfer bearing is greatly reduced. The transfer tube 40 can also be greatly shortened which is advantageous in terms of the space constraints. The pipe between the transfer bearing orifice and the protection valve is no longer required which makes the hydromechanical control unit housing design and manufacturing easier. Finally, the removal of the transfer bearing orifice means that there is no need for manual rigging operation of the transfer tube 40.

A summary of the operation of the control system shown in FIG. 2 will now be described. The transfer tube 40 is provided within the actuator 100 as described with reference to in FIG. 1. In this architecture, the blade pitch feedback used by the propeller control system is again obtained by measuring the aft side displacement of the transfer tube 40 of the actuator 100; that is, the end of the actuator 100 that is opposite to the end that is connected to the propeller. The measure is generally done by the following method. First, the transfer tube 40 rotates and translates in the hydromechanical control unit referential. Next, a trolley follows the transfer tube 40 translation and cancels the rotation. A lever transforms the translation from the trolley to a first rotary variable differential transformer (RVDT) sensor 150, i.e. the position control sensor 150. A spring connected to the lever maintains the contact between the lever, the trolley and the transfer tube 40. Both linear and rotational movement of the transfer tube 40 is thereby translated to pure linear motion. In this way, the position control sensor 150 monitors the angular displacement of the transfer tube 40. Based on this measured displacement, the position control sensor 150 is configured to produce an electrical signal output with direct comparability to the axial movement of the transfer tube 40. The output signal provided by the control sensor 150 is sent to the electronic control unit 200. Based on the signal sent from the control sensor 150; the electronic control unit 200 is configured to use the hydraulic fluid within the system to control and move the actuator 100 as appropriate, to thereby control the movement and blade pitch.

The system of FIG. 2 comprises a control device 105, which is similar to the hydromechanical control unit 115 of FIG. 1 for the control command function but differs therefrom for the protection function. The control device 105 comprises an electro-hydraulic servovalve device 16, a protection valve 17 and at least one protection activation unit 80, configured to control movement of the protection valve 17. The protection valve 17 is in fluid communication with the actuator 100 and the electro-hydraulic servovalve device 16 can be selectively set in fluid communication with the actuator 100 through the protection valve 17. The electronic unit 200 is configured to, based on said control feedback signal, command through a control command the electro-hydraulic servovalve device 16 and thereby the movement of said actuator 100. The control device may further comprise a feather triggering system solenoid 190, configured to control movement of the protection valve 17, to bypass the primary control device (electrohydraulic valve 16) through protection valve 17 in case of failure.

The position control sensor 150 is configured to interact with the actuator 100, to detect actuator 100 position and thereby said blade pitch of said propeller, and to send a control feedback signal to said electronic unit 200 via a first channel 151, based on said blade pitch.

The protection sensor 160 is configured to interact with said actuator 100, to detect actuator 100 position and thereby said blade pitch of said propeller, and to send a protection feedback signal to said electronic unit 200 via a second channel 161, based on said blade pitch.

In contrast to the architecture shown in FIG. 1, in this example, rather than using a hydromechanical protection system to prevent too low a blade pitch being reached, the protection system of FIG. 2 comprises a position protection sensor 160 that is configured to be used in combination with the electronic unit 200 embedded propeller protection soft-ware.

As can be seen in FIG. 2, the transfer tube 40 of the actuator 100 is connected at its aft end to both the position control sensor 150 and the protection sensor 160.

The position control and protection sensors 150, 160 are configured to work independently of each other, such that they provide a dual channel device that is configured to have the capability to provide independent feedbacks via two separate and individual channels of the electronic unit 200, if requested. Upon detection by the protection sensor 160, that the blade pitch has reached a certain predefined level or threshold, the protection sensor 160 sends a protection feedback signal to the electronic unit 200. Based on this protection feedback signal, the electronic protection soft-ware in the electronic unit 200 is configured to control the control device 105 as follows: if the electronic unit 200 receives a low pitch angle from the protection sensor 160 (which is measuring the transfer tube 40 position), that is to say when the protection feedback signal indicates that the blade pitch has reached the predefined value, for instance when the blade pitch value is below a blade pitch value threshold, it sends a protection command to the protection activation unit 80. By doing this, the protection valve 17, which is hydraulically piloted by the protection activation unit 80, changes its state from nominal to protected. In protected mode, the protection valve 17 isolates the actuator 100 from the electro-hydraulic servovalve device 16, thereby overriding the control command, and connects the coarse chamber to supply pressure and the fine chamber to return, so that the actuator 100 goes toward a higher pitch position, as discussed for example in EP 3670333 A1. In this way, not only is the blade pitch of this architecture con-trolled electronically, but low blade pitch protection is also performed electronically. This results in a fully redundant transfer tube translation measurement for both control and protection in order to electronically pilot the secondary low pitch stop protection. In addition to this, for a propeller system architecture where the transfer tube is not translating and the pitch measure is done directly at blades level, the SLPS can be electronically ensured by electronic protection software embedded in the electronic unit through a solenoid triggering/un-triggering (potentially dual channel solenoid).

Benefits of this architecture include that the protection sensor (for instance RVDT) can measure a stroke higher than an effective transfer tube stroke so no more rigging is necessary at transfer tube level during assembly. This in turn reduces the risk of human error. Since there is no more hydromechanical protection, the transfer tube and its sleeve are easier to manufacture. There is also no need to have a third pipe arriving to the aft side of the transfer tube. The overall blade pitch control and protection system leads to weight and cost reduction, as well as to a more compact system.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. A blade pitch control and protection system for a propeller comprising:

an actuator configured to be connectable to a propeller, such that displacement of said actuator corresponds to a change in blade pitch of said propeller;

an electronic unit;

a position control sensor configured to interact with said actuator, to detect actuator position and thereby said blade pitch of said propeller, and to send a control feedback signal to said electronic unit via a first chan-nel, based on said blade pitch; and a protection sensor configured to interact with said actua-tor to detect actuator position and thereby said blade pitch of said propeller, and to send a protection feed-back signal to said electronic unit via a second channel, based on said blade pitch, wherein said electronic unit is configured to, based on said control feedback signal received from the position sensor on the first channel, control movement of said actuator through a control command to alter said blade pitch, and wherein said electronic unit is further configured to, based on said protection feedback signal received from the protection sensor on the second channel, control move-ment of said actuator through a protection command such that said blade pitch control command is overrid-den when said protection feedback signal indicates that the blade pitch has reached a predefined value, a protection valve, in fluid communication with the actua-tor, wherein activation of the protection valve is con-figured to result in the actuation of blades of the propeller towards a coarse pitch, wherein transmission via the first channel of the controller occurs to control propeller pitch in operation of the propeller below an overspeed threshold and via the second channel, which is segregated from the first channel, to activate the protection valve in operation of the propeller above the overspeed threshold.

2. The system of claim 1, wherein said predefined value is below a blade pitch value threshold, and the electronic unit is configured to, based on said protection feedback signal, control movement of said actuator through a protec-tion command such that said blade pitch of said propeller is increased when said protection feedback signal indicates that the blade pitch has reached the predefined value.

3. The system of claim 1, wherein said control and protection sensors are configured to function mechanically and electrically independently of each other and have the capability to provide independent feedback signals via the first and second channels to the electronic unit.

4. The system of claim 1, wherein said control and protection sensors are simplex, duplex or triplex sensors.

5. The system of claim 1, wherein said first and second channels are single channel, dual channel or triple feedback signal channels.

6. The system of claim 1, the actuator comprise a transfer tube, wherein each of the control and protection sensors is connected to the transfer tube.

7. The system of claim 6, wherein each of the control and protection sensors are connected to the transfer tube through dedicated redundant mechanical kinematics.

8. The system of claim 1, wherein one, or both of said control and protection sensors comprises one or more rotational displacement sensors.

9. The system of claim 8, wherein said one or more rotational displacement sensors comprise an RVDT sensor.

10. The system of claim 1, wherein one, or both of said control and protection sensors comprises one or more linear displacement sensor; or wherein said one or more displacement sensors comprises an LVDT sensor.

11. The system claim 1, further comprising a control device, said control device comprising:

an electro-hydraulic servovalve device;

at least one protection activation unit, configured to control movement of the protection valve;

wherein the electronic unit is configured to, based on said control feedback signal, command through a control command the electro-hydraulic servovalve device and thereby the movement of said actuator, and wherein, when said blade pitch has reached said predefined level, said electronic unit is configured to enable through a protection command said protection activation unit and thereby said protection valve and thereby isolate the actuator from the electro-hydraulic servovalve device, thereby overriding the control command.

12. The system of claim 11, wherein the protection valve is in fluid communication with the actuator, and wherein the electro-hydraulic servovalve device can be selectively set in fluid communication with the actuator through the protection valve.

13. A propeller comprising:

at least one blade; and a blade pitch control and protection system according to claim 1.

14. A method of controlling and protecting a blade pitch for a propeller comprising:

providing an actuator that is configured to be connectable to said propeller, such that displacement of said actuator corresponds to a change in blade pitch of said propeller;

providing an electronic unit, providing a position control sensor to said actuator, said position control sensor being configured to interact with said actuator, to detect actuator position and thereby said blade pitch of said propeller, and said position control sensor sending a control feedback signal to said electronic unit via a first channel, based on said blade pitch, and providing a protection sensor to said actuator, configured to interact with said actuator and to detect actuator position and thereby said blade pitch of said propellor, and said protection sensor sending a protection feedback signal to said electronic unit via a second channel, based on said blade pitch, said electronic unit controlling through a control command, based on said control feedback signal, movement of said actuator to alter said blade pitch, and said electronic unit controlling through a protection command, based on said protection feedback signal, movement of said actuator such that said blade pitch control command is overridden when said protection feedback signal indicates that the blade pitch has reached a predefined value;

providing a protection valve, in fluid communication with the actuator, wherein activation of the protection valve is configured to result in the actuation of blades of the propeller towards a coarse pitch, wherein transmission via the first channel of the controller occurs to control propeller pitch in operation of the propeller below an overspeed threshold and via the second channel, which is segregated from the first channel, to activate the protection valve in operation of the propeller above the overspeed threshold.

15. The method of claim 14, further comprising providing a control device, said control device comprising an electro-hydraulic servovalve device, a protection valve, and at least one protection activation unit; and controlling, via said protection activation unit, movement of said protection valve, the electronic unit commanding through a control command, based on said control feedback signal, movement of said electro-hydraulic servovalve device, and thereby the movement of said actuator, and wherein, when said blade pitch has reached said predefined level, said electronic unit enables through a protection command said protection activation unit and thereby said protection activation valve, isolating the actuator from the electro-hydraulic servovalve device and thereby overriding the control command.

16. A blade pitch control and protection system for a propeller comprising:

an actuator configured to be connectable to a propeller, such that displacement of said actuator corresponds to a change in blade pitch of said propeller;

an electronic unit;

a position control sensor configured to interact with said actuator, to detect actuator position and thereby said blade pitch of said propeller, and to send a control feedback signal to said electronic unit via a first channel, based on said blade pitch; and a protection sensor configured to interact with said actuator to detect actuator position and thereby said blade pitch of said propeller, and to send a protection feedback signal to said electronic unit via a second channel, based on said blade pitch, wherein said electronic unit is configured to, based on said control feedback signal received from the position sensor on the first channel, control movement of said actuator through a control command to alter said blade pitch, and wherein said electronic unit is further configured to, based on said protection feedback signal received from the protection sensor on the second channel, control movement of said actuator through a protection command such that said blade pitch control command is overridden when said protection feedback signal indicates that the blade pitch has reached a predefined value, wherein the actuator comprises a transfer tube, wherein each of the control and protection sensors is connected to the transfer tube; and wherein each of the control and protection sensors are connected to the transfer tube through dedicated redundant mechanical kinematics.

* * * * *